(12) United States Patent
Mukaiyama

(10) Patent No.: US 6,883,391 B2
(45) Date of Patent: Apr. 26, 2005

(54) ROTARY SENSOR

(75) Inventor: Ryuji Mukaiyama, Miyagi-ken (JP)

(73) Assignee: Alps Electric Co., LTD, Tokyo (JP)

( * ) Notice: Subject to any disclaimer, the term of this patent is extended or adjusted under 35 U.S.C. 154(b) by 0 days.

(21) Appl. No.: 10/702,903

(22) Filed: Nov. 5, 2003

(65) Prior Publication Data

US 2004/0093936 A1 May 20, 2004

(30) Foreign Application Priority Data

Nov. 14, 2002 (JP) ........................ 2002-331154
Mar. 4, 2003 (JP) ........................ 2003-057163

(51) Int. Cl.$^7$ ............................................. G01L 3/18
(52) U.S. Cl. ................... 73/862.12; 73/118.1
(58) Field of Search ................. 73/862.12, 862.08, 73/118.1

(56) References Cited

U.S. PATENT DOCUMENTS

| | | | | |
|---|---|---|---|---|
| 5,088,319 A | * | 2/1992 | Hirose et al. | 73/118.1 |
| 5,460,035 A | * | 10/1995 | Pfaffenberger | 73/118.1 |
| 6,029,510 A | * | 2/2000 | Nakaie et al. | 73/118.1 |
| 6,386,020 B1 | * | 5/2002 | Okumura | 73/118.1 |
| 6,474,146 B2 | | 11/2002 | Okumura | |
| 6,637,260 B2 | * | 10/2003 | Hosogoe | 73/118.1 |

FOREIGN PATENT DOCUMENTS

JP 2002-39789 2/2002

* cited by examiner

Primary Examiner—Edward Lefkowitz
Assistant Examiner—Corey D. Mack
(74) Attorney, Agent, or Firm—Beyer Weaver & Thomas LLP.

(57) ABSTRACT

In a rotary sensor according to the present invention, when a casing expands or contracts by changes in the external environment, relative sliding operation is performed between a rotator and a first elastic member in an axial direction of a drive shaft, so that a gap between the rotator and an insulating substrate need not change during expansion or contraction of the casing due to the external environment and/or during the movement of the drive shaft in the axial direction. Hence, the position of a sliding contact contacting a resistor pattern does not change so as to have excellent performances while when the drive shaft rapidly rotates, the first elastic member cannot be twisted, preventing the rotator from delaying the rotational transmission so as to have the excellent followingness of the rotator to the drive shaft.

9 Claims, 7 Drawing Sheets

ROTARY SENSOR

BACKGROUND OF THE INVENTION

1. Field of the Invention

The present invention relates to a rotary sensor capable of detecting a rotational angle transmitted from the outside for use as a throttle sensor of an automobile.

2. Description of the Related Art

A conventional rotary sensor will be described with reference to FIG. 12. A casing 51 is composed of a case 52 molded of a synthetic resin and a lid 53 covering an opening formed in the rear of the case 52.

The case 52 includes a sidewall 52b having an accommodation portion 52a formed within the sidewall 52b, a cylindrical receiving portion 52c protruding from the sidewall 52b into the accommodation portion 52a, a double-step shoulder 52d formed in the rear of the sidewall 52b adjacent to an opening, and a cylindrical section 52e formed so as to extend from the sidewall 52b.

The disk-shaped lid 53, including a cylinder section 53a disposed at the center, is placed on a shoulder 52d from the opening in the rear of the case 52, and is attached to the case 52 so as to close the opening by thermally caulking the rear of the sidewall 52b of the case 52.

A plurality of metallic terminals 54 for use as connectors are embedded in and attached to the case 52 with one end protruding within the accommodation portion 52a of the case 52 and with the other end protruding within the cylindrical section 52e.

A metallic support section 55 is formed in a truncated conical shape, and is held by inserting it into the cylinder section 53a.

A plate-like insulating substrate 56 has a hole 56a in the center, and is provided with an annular resistor pattern and a collector pattern (not shown) composed of a good conductor, which are formed on one surface of the insulating substrate 56. The resistor pattern and the collector pattern are in a state conducting electricity to a plurality of terminals 57 attached to the insulating substrate 56.

The periphery of the insulating substrate 56 is placed on the shoulder 52d so as to accommodate the insulating substrate 56 within the accommodation portion 52a in a state that the hole 56a is opposing the support section 55. The insulating substrate 56 is attached to the case 52 by pushing the external periphery of the insulating substrate 56 to the shoulder 52d by the lid 53 attached to the case 52, while the terminal 57 is connected with solder to the terminal 54, which is used for a connector and protrudes in the accommodation portion 52a.

A rotator 58 molded with a synthetic resin includes a disk section 58a, a cylindrical section 58b disposed in front of the center of the disk section 58a, a concave accommodating section 58c disposed within the cylindrical section 58b, a cylinder section 58d disposed on the bottom surface of the disk section 58a, and a concave engaging section 58e formed in the accommodating section 58c.

The rotator 58 is accommodated within the accommodation portion 52a of the case 52, and is rotatably held by inserting the cylindrical section 58b into the receiving portion 52c also by inserting the cylinder section 58d into the hole 56a of the insulating substrate 56 so that the support section 55 is fitted into the cylinder section 58d. Also, the rotator 58 is pivotablly supported by the support section 55 so as to enable the rotator 58 to incline.

An elastic member 59 is made of a ring-shaped rubber material, and arranged between the disk section 58a of the rotator 58 and the upper wall of the accommodation portion 52a. Also, the rotator 58 is constantly pushed to the support section 55 by a waving washer 63.

A sliding contact 60 is made of a conductive springing plate in a substantial arc shape. The sliding contact 60 is placed on the bottom surface of the disk section 58a, and its arc-shape portion is arranged along the circumferential direction of the disk section 58a by appropriate means while the end of the sliding contact 60 is attached to the rotator 58. The sliding contact 60 is slidable over a resistor pattern and a collector pattern in a deflected state. The resistor pattern, the collector pattern, and the sliding contact 60 constitute a detecting unit K2 composed of a rotary variable resistor for detecting a rotation angle.

An elastic member 61 made of a material with a springing property is formed in a U-shape as a whole by folding it into two, and includes an anchoring section 61a formed by cutting-up. The elastic member 61 is accommodated within the accommodating section 58c of the rotator 58, and the anchoring section 61a is brought into engagement with the engaging section 58e.

A drive shaft 62 connected to a throttle valve of an automobile or the like includes a projection 62a disposed at its end and extending in the direction of the axial line A. The drive shaft 62 reciprocally rotates in a predetermined rotational angle range.

The drive shaft 62 is inserted into the accommodating section 58c of the rotator 58, and pressed into contact with the internal wall of the accommodating section 58c by the elastic member 61, while the elastic member 61 is also pressed into contact with the internal wall of the accommodating section 58c.

In the rotary sensor having such a structure, during the rotation of the drive shaft 62, the rotator 58 is rotated because the projection 62a is pressed into contact with the rotator 58 by the elastic member 61. As a result, the sliding contact 60 slides over the resistor pattern and the collector pattern so as to operate the detecting unit K2 for detecting the rotational angle (see Japanese Unexamined Patent Application Publication No. 2002-39789, for example).

In general, in a conventional rotary sensor, if the pushing force from the drive shaft 62 to the rotator 58 is reduced, when the drive shaft 62 rapidly rotates, the elastic member 61 is twisted so as to produce the delaying the rotational transmission by the rotator 58, deteriorating the followingness of the rotator 58 relative to the drive shaft 62. For this reason, a strong pushing force from the drive shaft 62 to the rotator 58 is generally employed.

If the pushing force from the drive shaft 62 to the rotator 58 is increased, even when the drive shaft 62 rapidly rotates, the followingness of the rotator 58 relative to the drive shaft 62 is improved.

The drive shaft 62 has backlash in the direction of the axial line A because of errors in mounting, so that the drive shaft 62 may be moved in the direction of the axial line A (Z1 and Z2 directions) by vibration, etc.

In the state that the pushing force from the drive shaft 62 to the rotator 58 is strong, when the drive shaft 62 moves in the Z2 direction (direction of the drive shaft 62 coming off the rotator 58), if the combined frictional force of the frictional force between the drive shaft 62 and the elastic member 61 and that between the drive shaft 62 and the rotator 58 is increased larger than the combined force of the pushing force from the waving washer 63 to the rotator 58 and the frictional force in the Z1 direction between the elastic member 59 and the rotator 58, the rotator 58 moves so as to follow the movement of the drive shaft 62 in the Z2 direction.

Then, the height of the sliding contact 60 in use changes, so that the contact position to the resistor pattern in the circumferential direction is changed so as to change the value of resistance. As a result, the detection of the rotational angle fluctuates so as to deteriorate performances, so that during the movement of the drive shaft 62, the rotator 58 is prevented from moving by increasing the pushing force of the waving washer 63 larger than the combined frictional force of the frictional force between the drive shaft 62 and the elastic member 61 and that between the drive shaft 62 and the rotator 58.

If the pushing force of the waving washer 63 is increased in such a manner, the rotational moment required for rotating the rotator 58 must be increased. As a result, the twist amount of the elastic member 61 is increased so as to produce the delaying the rotational transmission by the rotator 58, deteriorating the followingness of the rotator 58 relative to the drive shaft 62.

In addition, as for the movement of the drive shaft 62 in the Z1 direction, the contact position of the sliding contact 60 to the resistor pattern is scarcely changed because one end of the rotator 58 is supported by the support section 55.

The elastic member 61 is retained to the rotator 58 with the anchoring section 61a while since the projection 62a of the drive shaft 62 is formed by cutting so as to have a rough surface, the projection 62a may have a large frictional coefficient by erosion during the usage.

Then, the combined frictional force of the frictional force between the drive shaft 62 and the elastic member 61 and that between the drive shaft 62 and the rotator 58 is increased larger than the pushing force from the waving washer 63 to the rotator 58, so that the rotator 58 eventually moves so as to follow the movement of the drive shaft 62 in the direction of the axial line A (Z1 and Z2 directions).

Then, when the rotator 58 moves in the Z2 direction, as described above, the gap between the rotator 58 and the insulating substrate 56 is changed so that the contact position of the sliding contact 60 to the resistor pattern changes so as to change the value of resistance. As a result, the detection of the rotational angle fluctuates so as to deteriorate performances.

Furthermore, in the state that the pushing force by the drive shaft 62 to the rotator 58 is increased or that the frictional coefficient is increased by the erosion of the projection 62a, if the casing 51 expands by the external heat, since an annular flange formed on a sidewall of the case 52 is firmly held to an engine with screws, the insulating substrate 56 and the lid 53 supported by the case 52 are pushed downward, i.e., in the Z1 direction (the direction of the support section 55 separating from the rotator 58). At this time, since in comparison with the pushing force from the waving washer 63 in the Z1 direction, the contacting force is larger or the combined force of the frictional force between the rotator 58, the elastic member 61, and the rotator 58 and the sliding pressure of the sliding contact 60 is larger, the rotator 58, the elastic member 61, and the drive shaft 62 are not moved while the insulating substrate 56 and the lid 53 move in the state that the initial positions are maintained.

Then, the gap between the rotator 58 and the insulating substrate 56 is changed so that the contact position of the sliding contact 60 to the resistor pattern changes so as to change the value of resistance. As a result, the detection of the rotational angle fluctuates so as to deteriorate performances.

When the case 52 contracts after expansion, the insulating substrate 56 returns to the original position, and the gap is changed so that the contact position of the sliding contact 60 to the resistor pattern changes so as to change the value of resistance. As a result, the detection of the rotational angle fluctuates so as to deteriorate performances.

In a conventional rotary sensor, since the pushing force of the waving washer 63 is increased larger than the combined frictional force of the frictional force between the drive shaft 62 and the elastic member 61 and that between the drive shaft 62 and the rotator 58 so as to not move the rotator 58 during the movement of the drive shaft 62, the rotational moment required for rotating the rotator 58 must be increased. As a result, there is a problem that the amount of twist of the elastic member 61 is increased, so that the rotational transmission by the rotator 58 is delayed, deteriorating the followingness of the rotator 58 relative to the drive shaft 62.

If the drive shaft 62 is eroded in use, the coefficient of friction is increased, so that the combined frictional force of the frictional force between the drive shaft 62 and the elastic member 61 and that between the drive shaft 62 and the rotator 58 is increased larger than the value subtracting the sliding pressure of the sliding contact 60 from the pushing force by the waving washer 63 to the rotator 58. As a result, the rotator 58 moves to follow the movement of the drive shaft 62 in the direction of the axial line A (Z2 direction), and the gap between the rotator 58 and the insulating substrate 56 is changed so that the contact position of the sliding contact 60 to the resistor pattern changes so as to change the value of resistance. Therefore, the detection of the rotational angle fluctuates so as to deteriorate performances.

During the expansion and cotraction of the case 52 of the casing 51, the gap between the rotator 58 and the insulating substrate 56 is changed so that the contact position of the sliding contact 60 to the resistor pattern changes so as to change the value of resistance. As a result, there is a problem that the detection of the rotational angle fluctuates so as to deteriorate performances.

SUMMARY OF THE INVENTION

Accordingly, it is an object of the present invention to provide a rotary sensor with improved followingness of a rotator relative to a drive shaft and with excellent performances as well.

In order to solve the problems described above, a rotary sensor according to the present invention comprises a casing having a support portion; a rotator rotatably supported within the casing; detecting means operated by the rotation of the rotator; a first elastic member attached to the rotator; a drive shaft supported by the first elastic member for rotating the rotator; and a second elastic member for pushing one end of the rotator to the support portion by pushing the rotator in the axial direction of the drive shaft, wherein between the rotator and the first elastic member, the first elastic member is held to the rotator relatively and slidably in the axial direction of the drive shaft so as to enable the one end of the rotator to be pushed to the support portion when the support portion moves away from the rotator in the axial direction and/or when the drive shaft moves relatively to the rotator in the axial direction coming off the rotator.

By such a structure, during the expansion and contraction of the casing due to changes in external environment, the gape between rotator and the insulating substrate need not change, so that the contact position of the sliding contact to the resistor pattern is not changed, resulting in obtaining excellent performances.

According to the present invention, preferably, the drive shaft is clamped by the first elastic member, and the frictional force between the drive shaft and the first elastic member is larger than the frictional force between the first elastic member and the rotator, so that when the drive shaft moves in the axial direction, relative sliding is performed between the rotator and the first elastic member in the axial direction of the drive shaft without moving the rotator in the axial direction of the drive shaft.

By performing the relative sliding between the rotator and the first elastic member in the axial direction of the drive shaft, the frictional force between the first elastic member and the drive shaft becomes irrelevant to the pushing force from the second elastic member to the rotator. Therefore, the pushing force from the second elastic member to the rotator can be reduced while the clamping force to the drive shaft by the first elastic member can be increased. Accordingly, when the drive shaft rapidly rotates, the first elastic member cannot twist, preventing the rotator from delaying the rotational transmission so as to have the excellent followingness of the rotator to the drive shaft.

According to the present invention, preferably, the drive shaft is clamped between the first elastic member and the rotator by pushing the first elastic member so as to elastically push the rotator while the combined frictional force of the frictional force between the drive shaft and the first elastic member and that between the drive shaft and the rotator is larger than the frictional force between the first elastic member and the rotator, so that when the drive shaft moves in the axial direction, relative sliding is performed between the rotator and the first elastic member in the axial direction of the drive shaft without moving the rotator in the axial direction of the drive shaft.

During the movement of the drive shaft in the direction of the axial line A (Z2 direction) due to vibration, etc., the sliding movement is performed between the first elastic member and the rotator, so that the rotator does not move in the direction of the axial line A (Z2 direction) and the contact position of the sliding contact to the resistor pattern is not changed, resulting in obtaining excellent performances.

According to the present invention, preferably, when the casing expands or contracts by changes in the external environment, the drive shaft and the first elastic member do not move so as to maintain initial positions while the rotator is moved by the second elastic member.

Thereby, sliding movement is performed between the rotator and the first elastic member so that the gap between the rotator and the insulating substrate is not changed during the expansion and contraction of the casing due to changes in external environment and the contact position of the sliding contact to the resistor pattern is not changed, resulting in obtaining excellent performances.

According to the present invention, preferably, the first elastic member is accommodated and attached within a concave accommodation portion disposed in the rotator, and relative sliding is performed between a wall of the accommodation portion and the first elastic member.

Thereby, the mounting of the first elastic member is simplified, improving manufacturing efficiency.

According to the present invention, preferably, the first elastic member is U-shaped while the drive shaft is clamped and supported by the U-shaped first elastic member, and in the state that the drive shaft and the first elastic member maintain the initial positions, relative sliding is performed between the wall of the accommodation portion and the first elastic member.

Thereby, the clamping force from the first elastic member to the drive shaft can be increased while the frictional force between the first elastic member and the rotator can be reduced so as to improve the sliding between the first elastic member and the rotator.

According to the present invention, preferably, the U-shaped first elastic member comprises a pair of first and second legs opposing each other with both of one end connected together with a connection portion, and the respective first and second legs elastically push the wall of the accommodation portion. Thereby, the first elastic member can be securely held.

According to the present invention, preferably, the wall of the accommodation portion is provided with a concave engaging section while the leg is provided with a protruding anchoring section so that the engaging section can be brought into engagement with the anchoring section, preventing the first elastic member from coming off the rotator. Thereby, the first elastic member can be easily prevented from coming off.

According to the present invention, preferably, the rotator is molded from a synthetic resin while the first elastic member is made of a metallic leaf spring. Thereby, the sliding between the first elastic member and the rotator is improved.

DESCRIPTION OF THE PREFERRED EMBODIMENTS

Figure 1:
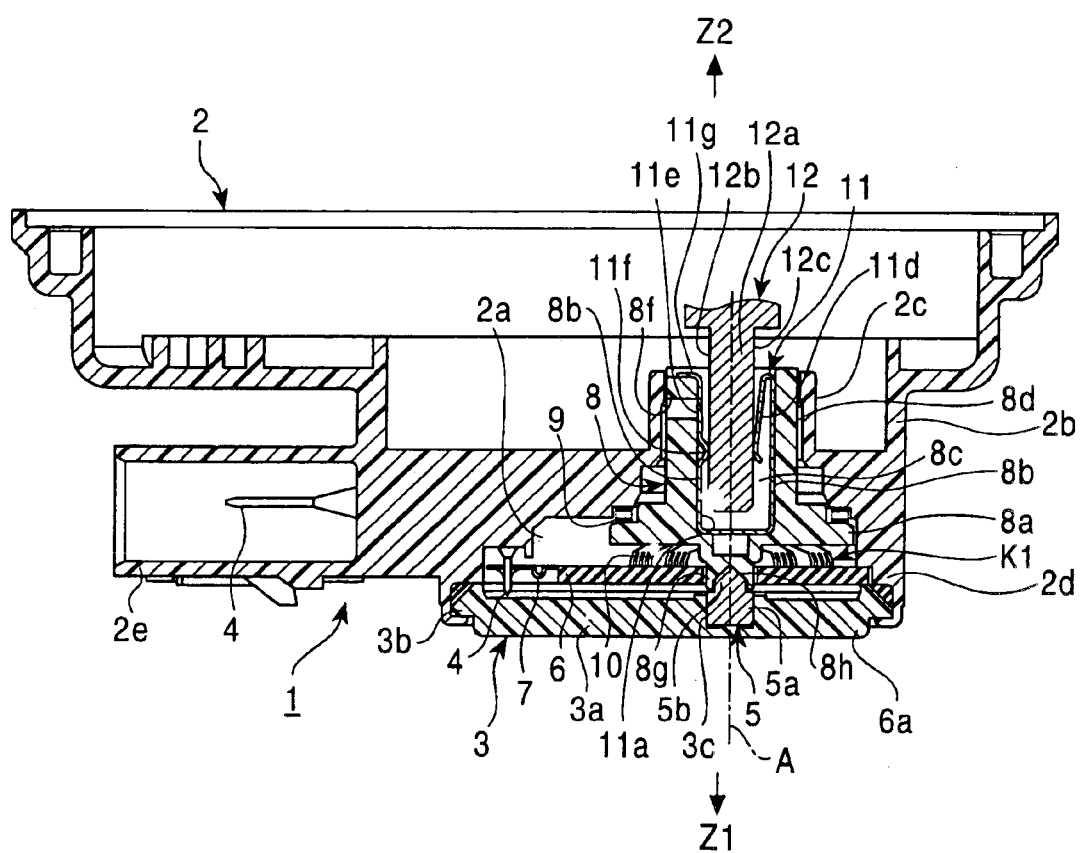
FIG. 1 is a sectional view of a rotary sensor according to a first embodiment of the present invention.
Figure 2:
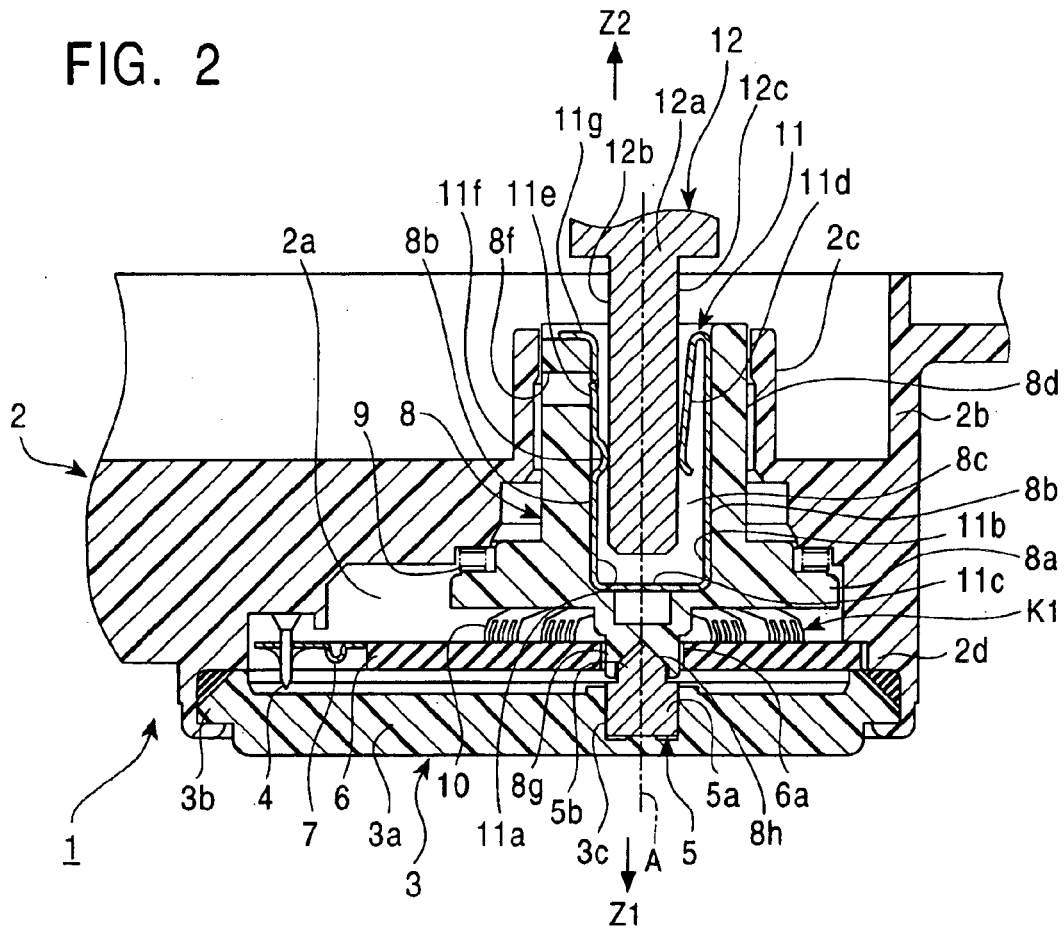
FIG. 2 is an enlarged sectional view of an essential part of the rotary sensor according to the first embodiment.
Figure 3:
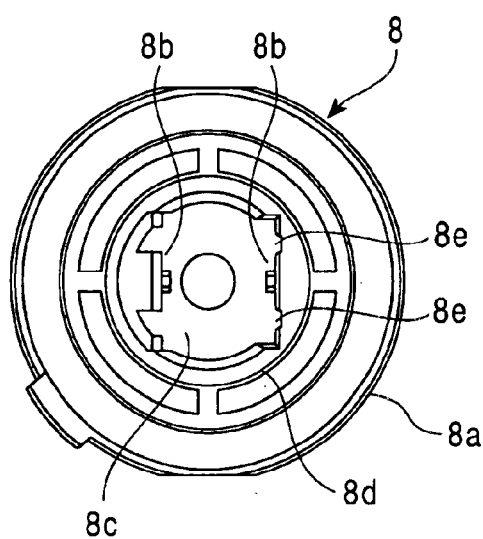
FIG. 3 is a plan view of a rotator according to the first embodiment of the rotary sensor.
Figure 4:
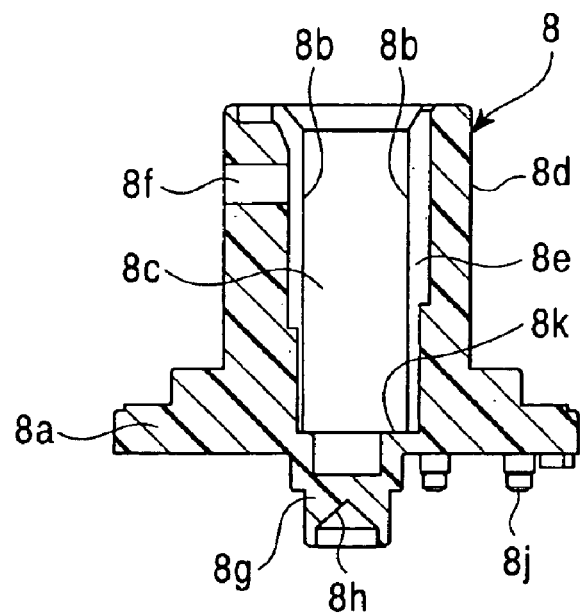
FIG. 4 is an enlarged sectional view of an essential part of the rotator according to the first embodiment of the rotary sensor.
Figure 5:
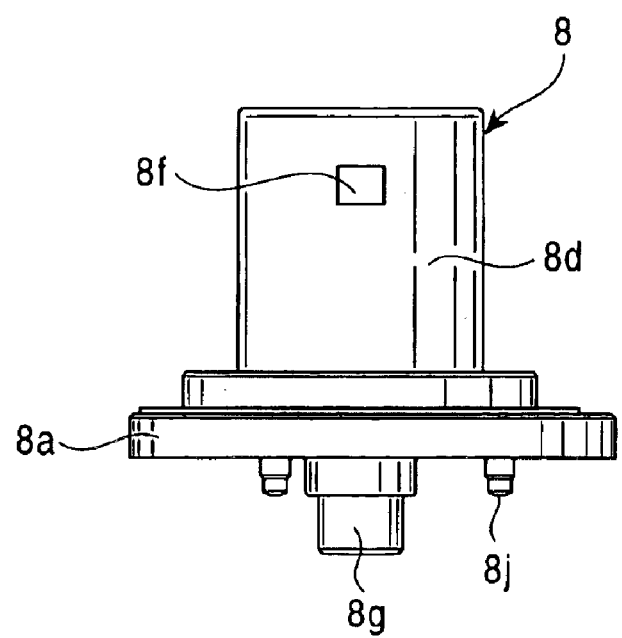
FIG. 5 is a side view of the rotator according to the first embodiment of the rotary sensor.

FIG. 1 is a sectional view of a rotary sensor according to a first embodiment of the present invention; FIG. 2 is an enlarged sectional view of an essential part of the rotary sensor according to the first embodiment; FIG. 3 is a plan view of a rotator according to the first embodiment of the rotary sensor; FIG. 4 is an enlarged sectional view of an essential part of the rotator according to the first embodiment of the rotary sensor; and FIG. 5 is a side view of the rotator according to the first embodiment of the rotary sensor.

Figure 6:
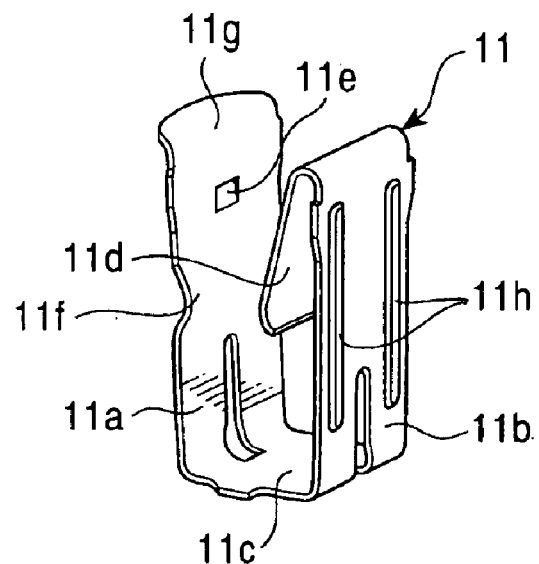
FIG. 6 is a perspective view of an elastic member according to the first embodiment of the rotary sensor.
Figure 7:
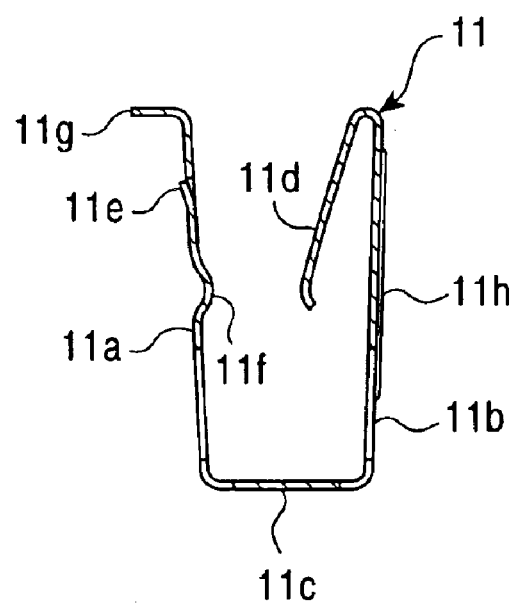
FIG. 7 is a sectional view of the elastic member according to the first embodiment of the rotary sensor.
Figure 8:
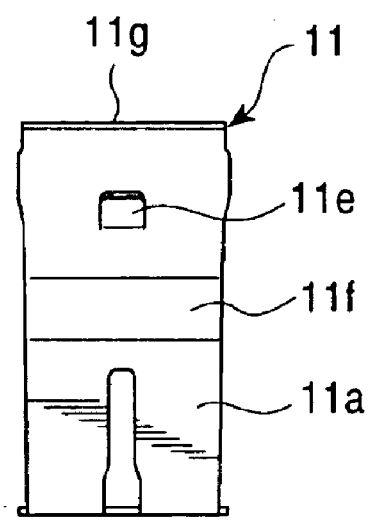
FIG. 8 is a left side view of the elastic member according to the first embodiment of the rotary sensor.
Figure 9:
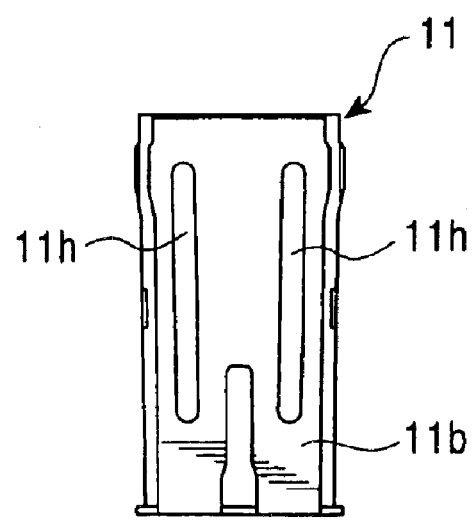
FIG. 9 is a right side view of the elastic member according to the first embodiment of the rotary sensor.

FIG. 6 is a perspective view of an elastic member according to the first embodiment of the rotary sensor; FIG. 7 is a sectional view of the elastic member according to the first embodiment of the rotary sensor; FIG. 8 is a left side view of the elastic member according to the first embodiment of the rotary sensor; and FIG. 9 is a right side view of the elastic member according to the first embodiment of the rotary sensor.

Figure 10:
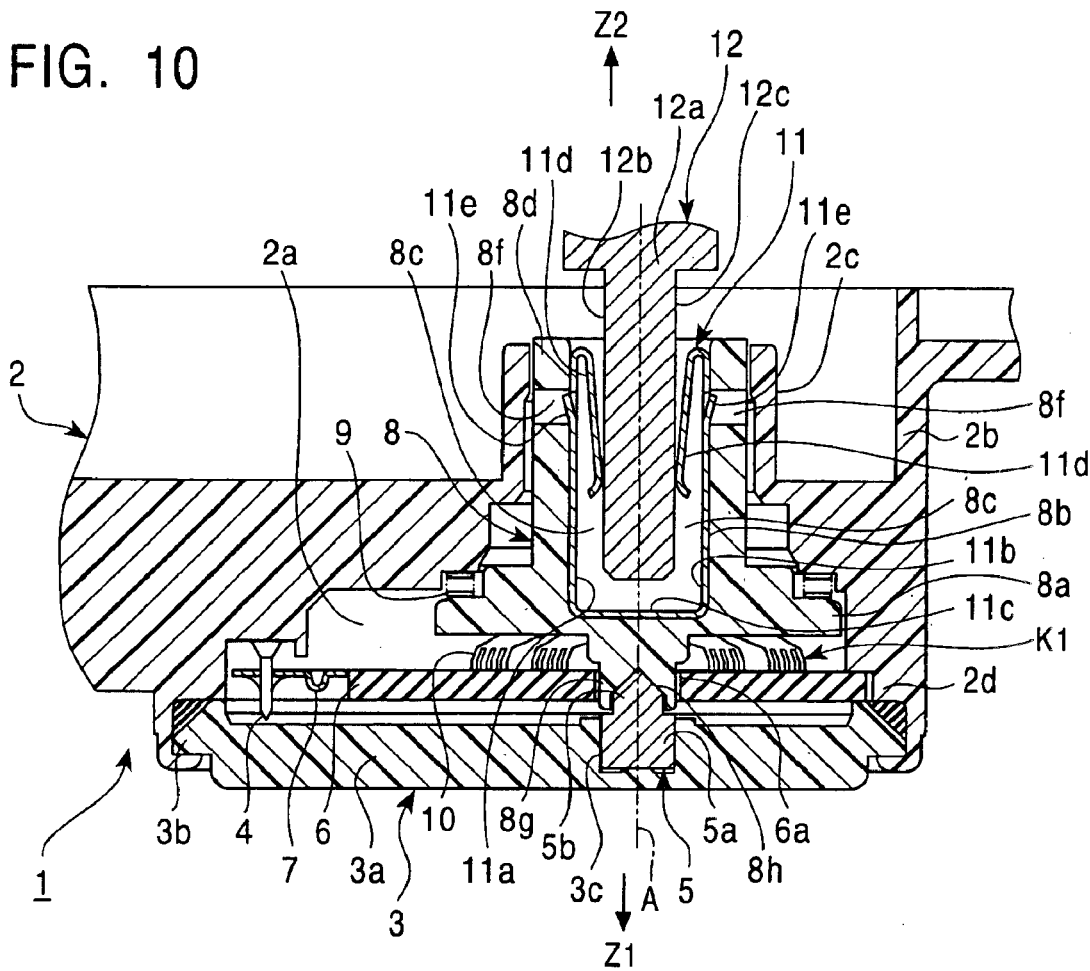
FIG. 10 is an enlarged sectional view of an essential part of a rotary sensor according to a second embodiment of the present invention.
Figure 11:
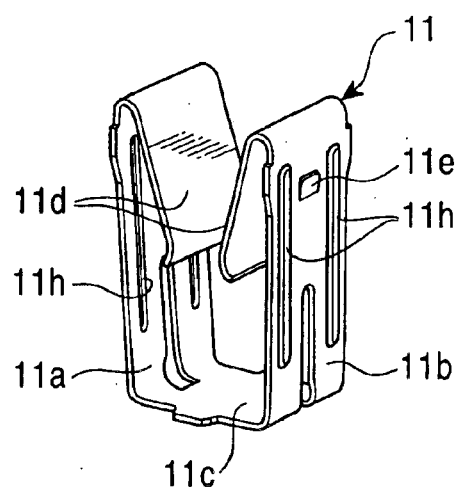
FIG. 11 is a perspective view of an elastic member according to the second embodiment of the rotary sensor.

FIG. 10 is an enlarged sectional view of an essential part of a rotary sensor according to a second embodiment of the present invention; and FIG. 11 is a perspective view of an elastic member according to the second embodiment of the rotary sensor.

The rotary sensor according to the first embodiment will be described below with reference to FIGS. 1 to 9. A casing 1 includes a case 2 molded of a synthetic resin and a lid 3 covering an opening formed in the rear of the case 2.

The case 2 includes a sidewall 2b having an accommodation portion 2a formed within the sidewall 2b, a cylindrical receiving portion 2c protruding from the sidewall 2b into the accommodation portion 2a, a double-step shoulder 2d formed in the rear of the sidewall 2b adjacent to the opening, and a cylindrical section 2e formed from the sidewall 2b so as to extend perpendicularly to the sidewall 2b.

The disk-shaped lid 3 includes a plate section 3a, a flange 3b formed in the periphery of the plate section 3a, and a recess 3c formed in the center of the plate section 3a.

The lid 3 is placed on the shoulder 2d from the opening in the rear of the case 2, and is attached to the case 2 so as to close the opening by thermally caulking the rear of the sidewall 2b.

A plurality of metallic terminals 4 for use as connectors are embedded in and attached to the case 2 with one end protruding within the accommodation portion 2a of the case 2 and with the other end protruding within the cylindrical section 2e.

A metallic support section 5 includes a columnar portion 5a and a conical portion 5b so as to be held by inserting the columnar portion 5a into the recess 3c.

In addition, the support section 5 may also be formed integrally with the lid 3.

A plate-like insulating substrate 6 has a hole 6a in the center, and is provided with an annular resistor pattern and a collector pattern composed of a good conductor (not shown) formed on one surface of the insulating substrate 6. The resistor pattern and the collector pattern are in a state conducting electricity to a plurality of terminals 7 attached to the insulating substrate 6.

The periphery of the insulating substrate 6 is placed on the shoulder 2d so as to accommodate the insulating substrate 6 within the accommodation portion 2a in a state that the hole 6a is opposing the support section 5. The insulating substrate 6 is attached to the case 2 by pushing the external periphery of the insulating substrate 6 to the shoulder 2d, while the terminal 7 is connected with solder to the terminal 4 used for a connector and protruding in the accommodation portion 2a.

A rotator 8 molded with a synthetic resin, as shown especially in FIGS. 3 to 5, includes a disk section 8a, a holding section 8d having a concave accommodating portion 8c having a pair of flat and rigid walls 8b cylindrically protruding forward from the center of the disk section 8a so as to oppose each other, a recess 8e formed on at least one of the walls 8b in an extending direction of the cylindrical holding section 8d, a concave engaging section 8f formed in the holding section 8d so as to penetrate it toward the accommodating portion 8c, a projection 8g protruding rearward from the disk section 8a, a conical recess 8h formed in the rear of the projection 8g, and a projection 8j formed on the bottom surface of the disk section 8a.

That is, the walls 8b formed in the cylindrical holding section 8d are made in a rigid state without deflection.

Also, the holding section 8d has been described as a rigid and cylindrical member; alternatively, it may be a pair of upright rigid walls opposing each other.

The rotator 8 is accommodated within the accommodation portion 2a of the case 2, and is rotatably held by inserting the cylindrical holding section 8d into the receiving portion 2c and also by inserting the projection 8g into the hole 6a of the insulating substrate 6 so that the conical portion 5b is fitted into the recess 8h. Also, the rotator 8 is pivotablly supported by the projection 8g so as to enable the rotator 8 to incline.

Also, the lower end of the rotator 8 abuts the support section 5, so that the distance between the bottom surface of the disk section 8a and the insulating substrate 6 is determined directly and exclusively.

The rotator 8 is also arranged between the disk section 8a and the upper wall of the accommodation portion 2a, and is constantly pressurized to the support section 5 by an elastic member 9 such as an annular and waving washer.

A sliding contact 10 is made of a conductive springing plate in a substantial arc shape. The sliding contact 10 is placed on the bottom surface of the disk section 8a by arranging its arc-shape portion along the circumferential direction of the disk section 8a, and is attached to the rotator 8 by thermally caulking the projection 8j with its end, so that the sliding contact 10 can slide over the resistor pattern and the collector pattern in a deflected state.

The resistor pattern, the collector pattern, and the sliding contact 10 constitute a detecting unit K1 composed of a rotary variable resistor for detecting a rotation angle.

In addition, other than the rotary variable resistor, the detecting unit K1 may also is composed of a rotary encoder with a switching pattern instead of the resistor pattern, or it may be composed of a magnetic variable resistor or a magnetic encoder with a magnet instead of the resistor pattern and with a magnetic converting element instead of the sliding contact, for example.

An elastic member 11 made of a metallic material with a springing property such as a leaf spring, as shown especially in FIGS. 6 to 9, is formed in a U-shape as a whole including first and second legs 11a and 11b opposing each other, a connecting section 11c connecting one end of the first leg 11a to one end of the second leg 11b, and a curved elastic arm 11d formed by folding back the free end of the second leg 11b so as to locate the free end between the first and second legs 11a and 11b.

The first leg 11a of the elastic member 11 includes an anchoring section 11e formed so as to protrude by cutting-up, a support section 11f composed of a rigid rib with a rounded apex, and a curved section 11g formed by outward folding the free end.

The support section 11f composed of the rib protrudes toward the second leg 11b while being formed across the first leg 11a in the width direction.

The second leg 11b is provided with a longitudinally extending two-streak (plural-streak) rib section 11h.

In addition, the rib section 11h may be with one streak, or may be formed in any one of the first and second legs 11a and 11b, or in both of them.

The elastic member 11 is accommodated within the accommodating portion 8c of the rotator 8 by inserting it from the connecting section 11c thereinto while the first and second legs 11a and 11b are abutting the walls 8b of the accommodating portion 8c.

During the insertion, when the anchoring section 11e coincides with the engaging section 8f, the engaging section 8f can be brought into engagement with the anchoring section 11e, preventing the elastic member 11 from coming off the accommodating portion 8c.

During the attaching of the elastic member 11 to the rotator 8, the rib section 11h is located within the recess 8e, so that the first and second legs 11a and 11b are elastically pushed on the walls 8b while the connecting section 11c is abutting the bottom 8k of the rotator 8.

In the state of the connecting section 11c abutting the bottom 8k of the rotator 8, the anchoring section 11e is in a non-engagement state with the engaging section 8f, so that the elastic member 11 and the rotator 8 are relatively movable until the anchoring section 11e is brought into engagement with the engaging section 8f.

In addition, the curved section 11g is provided for easily pushing and attaching the elastic member 11 to the recess 8e, so that a gap is slightly formed at the end of the holding section 8d.

A drive shaft 12 connected to a throttle valve of an automobile or the like includes a projection 12a disposed at its end and extending in the direction of the axial line A, and first and second flat portions 12b and 12c disposed so as to oppose the external surface of the projection 12a along the direction of the axial line A, so that the drive shaft 12 reciprocally rotates in a predetermined rotational angle range.

Also, the first and second flat portions 12b and 12c are made by cutting, so that micro unevenness is provided on those surfaces.

The drive shaft 12 is inserted into the accommodating portion 8c of the holding section 8d in a state that the projection 12a is located between the first and second flat portions 12b and 12c.

Then, the projection 12a is clamped by the support section 11f of the U-shaped elastic member 11 and the elastic arm 11d while the second flat portion 12c is pushed by the elastic arm 11d so that the first flat portion 12b is in a state that the first flat portion 12b abuts the apex of the support section 11f so as to be thereby supported.

At this time, the apex of the support section 11f composed of the rib is formed so as to extend relative to the axial line A in the orthogonal or the intersecting direction while the frictional force produced during the clamping the projection 12a with the support section 11f and the elastic arm 11d is reduced smaller than the load exerted on the rotator 8 in the direction of the axial line A (Z1 direction indicated by arrow).

The frictional force produced during the clamping the projection 12a with the support section 11f and the elastic arm 11d is increased larger than the frictional force between the first and second legs 11a and 11b and the walls 8b (the load exerted in the direction Z1 or Z2 indicated by arrow).

In this case, the load exerted in the direction Z1 equals to the value subtracting the load of the sliding contact 10 from the pressuring force of the elastic member 9.

As a result, the case 2 of the casing 1 expands by the external heat, so that since the external periphery of the case 2 is firmly held to the vehicle body (engine) in the same way as ever, the center of the case 2 is warped to protrude in the direction Z1 indicated by arrow (outward), and the insulating substrate 6 and the lid 3 supported by the case 2 are pushed downward, i.e., in the direction Z1 (the direction of the support section 5 separating from the rotator 8).

Then, the rotator 8, which is pressurized by the elastic member 9 in the direction of the axial line A (Z1 direction indicated by arrow), follows the movement of the insulating substrate 6 in a state that one end of the rotator 8 abuts the support section 5, so that the gap between the rotator 8 and the insulating substrate 6 does not change and the contact position of the sliding contact 10 to the resistor pattern is not changed, resulting in obtaining excellent performances because of the constant output even when the temperature changes.

At this time, the elastic member 11 and the drive shaft 12, which is clamped by the elastic member 11, do not move maintaining the initial positions, and the relative movement (sliding movement) between the rotator 8 and the elastic member 11 is performed.

That is, when the rotator 8 moves in the direction of the axial line A (Z1 direction indicated by arrow), the sliding movement between the elastic member 11 and the walls 8b of the rotator 8 is performed, so that the end of the holding section 8d separates from the curved section 11g while the upper portion of the engaging section 8f is to be located in the vicinity of the anchoring section 11e.

That is, the length between the upper portion of the engaging section 8f and the bottom of the connecting section 11c is reduced smaller than the length between the upper portion of the engaging section 8f and the bottom wall of the recess 8e within the degree permissible the relative movement between the elastic member 11 and the rotator 8 following the expansion of the case 2.

In addition, the engaging section 8f is provided for preventing the elastic member 11 from coming off the rotator 8 when the drive shaft 12 is separated for maintenance.

During the contraction of the case 2 of the casing 1 after the expansion, the sliding movement is also performed between the rotator 8 and the elastic member 11 so as to maintain the state that the lower end of the rotator 8 abuts the support section 5, so that the gap between the rotator 8 and the insulating substrate 6 does not change and the contact position of the sliding contact 10 to the resistor pattern is not changed, resulting in obtaining excellent performances.

When the drive shaft 12 is clamped, the vicinity of the support section 11f of the first leg 11a is pressed into contact with the walls 8b, so that the support section 11f does not deflect by the help of its rigidity. Furthermore, the rib section of the support section 11f is formed in a direction orthogonal to or intersecting the axial line A of the drive shaft 12. Thereby, even when the drive shaft 12 is out of alignment, the rotator 8 can tilt in the state that the support section 11f is linearly brought into contact with the drive shaft 12.

The drive shaft 12 has backlash because of errors in mounting, so that the drive shaft 12 may be moved in the direction of the axial line A (the Z2 direction of the drive shaft 12 coming off the rotator 8) by vibration, etc.

Whereas, according to the present invention, the frictional force between the first elastic member 11 and the rotator 8 is reduced smaller than the frictional force between the drive shaft 12 and the elastic member 11 and the pushing force to the rotator 8 by the elastic member 9 while the relative sliding movement is performed between the rotator 8 and the elastic member 11, so that there is no problem even any one of the frictional force between the drive shaft 12 and the elastic member 11 and the pushing force to the rotator 8 by the elastic member 9 is larger than the other.

Therefore, if in order to only solve the problem of movement of the drive shaft 12 in the Z2 direction, it is not necessary that the pushing force to the rotator 8 by the elastic member 9 be reduced smaller than the frictional force between the drive shaft 12 and the elastic member 11. Accordingly, the rotational torque of the rotator 8 can be reduced so as to reduce the torsion of the elastic member 11, enabling the followingness of the rotator 8 to the drive shaft 12 to be improved by the instant transmission of rotation to the rotator 8.

In such a manner, during the movement of the drive shaft 12 in the direction of the axial line A (Z1 and Z2 directions) due to vibration, etc., the sliding movement is performed between the elastic member 11 and the rotator 8, so that the rotator 8 does not move in the direction of the axial line A (Z1 and Z2 directions) while the elastic member 11 and the drive shaft 12 move in that direction.

Therefore, the gap between the rotator 8 and the insulating substrate 6 cannot be changed, resulting in obtaining excellent performances because of the constant contact position of the sliding contact 10 to the resistor pattern.

Since the projection 12a of the drive shaft 12 is formed by cutting, the projection 12a may have a large frictional coefficient by erosion during the usage so as to increase the frictional force between the drive shaft 12 and the elastic member 11; however the performances are the same.

In addition, as for the movement of the drive shaft 12 in Z1 direction, the contact position of the sliding contact 10 to the resistor pattern is scarcely changed because one end of the rotator 8 is supported by the support section 5.

In the rotary sensor having such a structure, during the rotation of the drive shaft 12, the rotator 8 is rotated in the state that the projection 12a is clamped by the support section 11f and the elastic arm 11d of the elastic member 11. As a result, the sliding contact 10 slides over the resistor pattern and the collector pattern so as to operate the detecting unit K1 for detecting the rotational angle.

If the drive shaft 12 is out of alignment, the rotator 8 is tilted at the pivoted position so as to follow the misalignment of the drive shaft 12.

Since the relative sliding movement is performed between the rotator 8 and the elastic member 11, the pushing force to the rotator 8 by the elastic member 9 can be reduced while the force clamping the drive shaft 12 by the elastic member 11 can be increased. Thereby, when the drive shaft 12 rapidly rotates, the elastic member 11 cannot twist, preventing the rotator 8 from delaying the rotational transmission so as to have the excellent followingness of the rotator 8 to the drive shaft 12.

According to the embodiment described above, the frictional force produced during the clamping the projection 12a with the support section 11f and the elastic arm 11d is increased larger than the frictional force between the first and second legs 11a and 11b and the walls 8b; alternatively, in the initial state, the reverse relationship may be set and along with an increase in the frictional force between the support section 11f, the elastic arm 11d and the projection 12a due to erosion of the drive shaft, the relationship between these forces may be again reversed.

In this case, the sliding between the drive shaft and the elastic member 11 in the initial state is changed to the sliding between the elastic member 11 and the walls 8b following the erosion of the drive shaft.

According to the embodiment, the rotator 8 cannot erode because of its material of a synthetic resin, the frictional force to the elastic member 11 can be stably smaller comparatively.

According to the embodiment, the support section 5 is formed in a convex shape including the columnar portion 5a and the conical portion 5b while the rotator 8 is tiltably pivoted; alternatively, the support section 5 may be formed in a concave shape and inserted by the lower end of the projection 8g so as to rotatably hold it.

Also, according to the embodiment, during the thermal expansion of the case 2, a phenomenon that the center of the case 2 warps so as to protrude in the Z1 direction has been described; even at low temperature, the invention may be effective to such deflection.

According to the embodiment, the lower end (one end) of the rotator 8 is supported by the support section 5, which in turn is supported by the lid 3.

The insulating substrate 6 is also pushed to the lid 3, so that both the elements are arranged in the state of closely contacting each other.

Therefore, when the case 2 deforms, the support section 5 and the rotator 8, which are arranged on the lid 3 and the insulating substrate 6, respectively, are deflected in the same way as the case 2, so that the contact position of the sliding contact 10 on the resistor also is not changed.

According to the embodiment, since the principal warping portion is outside the sidewall 2b of the case 2, there is no problem if the position of the case 2 holding the insulating substrate 6 is separated from the position of the case 2 holding the lid 3 in the height direction. Essentially, as for the deflection of the case 2 due to changes in temperature, the relative position of both elements may be enough maintained against the changes in temperature.

In addition, if in order to only solve the problem of the backlash of the drive shaft, there is no restriction about this point.

FIGS. 10 and 11 show a rotary sensor according to a second embodiment of the present invention. This second embodiment will be described with reference to FIGS. 10 and 11. The points different from the first embodiment are that the rotator 8 is provided with two concave engaging sections 8f and that the structure of the elastic member 11 is different. Since others are the same as the first embodiment, like reference characters designate elements common to the embodiments, and the description thereof is omitted.

Next, the elastic member 11 according to the second embodiment will be described. The elastic member 11 is formed in a U-shape as a whole, including first and second legs 11a and 11b opposing each other, a connecting section 11c connecting one end of the first leg 11a to one end of the second leg 11b, and curved elastic arms 11d formed by folding back the free ends of the first and the second legs 11a and 11b so as to locate the free ends between the first and second legs 11a and 11b.

The respective first and second legs 11a and 11b of the elastic member 11 are provided with the anchoring sections 11e formed so as to protrude by cutting-up and the two-streak (plural-streak) rib sections 11h.

The elastic member 11 is accommodated in the accommodating portion 8c of the rotator 8 by inserting it from the connecting section 11c thereinto while the first and second legs 11a and 11b are abutting the walls 8b of the accommodating portion 8c.

During the insertion, when the anchoring sections 11e coincide with the engaging sections 8f, the engaging sections 8f can be brought into engagement with the anchoring sections 11e, preventing the elastic member 11 from coming off the accommodating portion 8c when the drive shaft 12 is pulled out.

The rotator 8, which can be brought into engagement with the anchoring sections 11e, is movable within the range of the recesses of the engaging sections 8f, so that in the state of the upper ends of the engaging sections 8f abutting the anchoring sections 11e, the elastic member 11 and the rotator 8 are relatively movable until the anchoring sections 11e are brought into engagement with the engaging sections 8f while the elastic member 11 is prevented from coming off the accommodating portion 8c.

During the elastic member 11 is attached to the rotator 8, the rib sections 11h are located within the recesses 8e, and the first and second legs 11a and 11b are elastically pushed to the walls 8b, respectively.

Then, the projection 12a of the drive shaft 12 is clamped by a pair of the elastic arms 11d of the U-shaped elastic member 11 in the state that the projection 12a is located between the first and second legs 11a and 11b. The frictional force produced during the clamping the projection 12a with the pair of the elastic arms 11d is reduced smaller than the pushing force of the elastic member 9 for pushing the rotator 8 in the direction of the axial line A (Z1 direction).

Also, the relationship between the frictional force between the elastic member 11 and the drive shaft 12 and the frictional force between the elastic member 11 and the rotator 8 is set in the same way as in the first embodiment.

As a result, according to the second embodiment, in the same way as in the first embodiment, during the expansion and cotraction of the case 2 of the casing 1, the elastic member 11 and the drive shaft 12 do not move maintaining the initial positions while the relative sliding movement is performed between the rotator 8 and the elastic member 11. Therefore, the gap between the rotator 8 and the insulating substrate 6 cannot be changed, resulting in obtaining excellent performances because of the constant contact position of the sliding contact 10 to the resistor pattern.

Furthermore, according to the second embodiment, in the same way as in the first embodiment, since the relative sliding movement is performed between the rotator 8 and the elastic member 11, the pushing force by the elastic member 9 to the rotator 8 can be reduced while the clamping force by the elastic member 11 to the drive shaft 12 can be increased. Therefore, when the drive shaft 12 rapidly rotates, the elastic member 11 cannot be twisted, preventing the rotator 8 from delaying the rotational transmission so as to have the excellent followingness of the rotator 8 to the drive shaft 12.

Moreover, according to the second embodiment, in the same way as in the first embodiment, during the movement of the drive shaft 12 in the direction of the axial line A (Z2 direction) due to vibration, etc., the sliding movement is performed between the elastic member 11 and the rotator 8, so that the rotator 8 does not move in the direction of the axial line A (Z2 direction). Therefore, the gap between the rotator 8 and the insulating substrate 6 cannot be changed, resulting in obtaining excellent performances because of the constant contact position of the sliding contact 10 to the resistor pattern.

Figure 12:
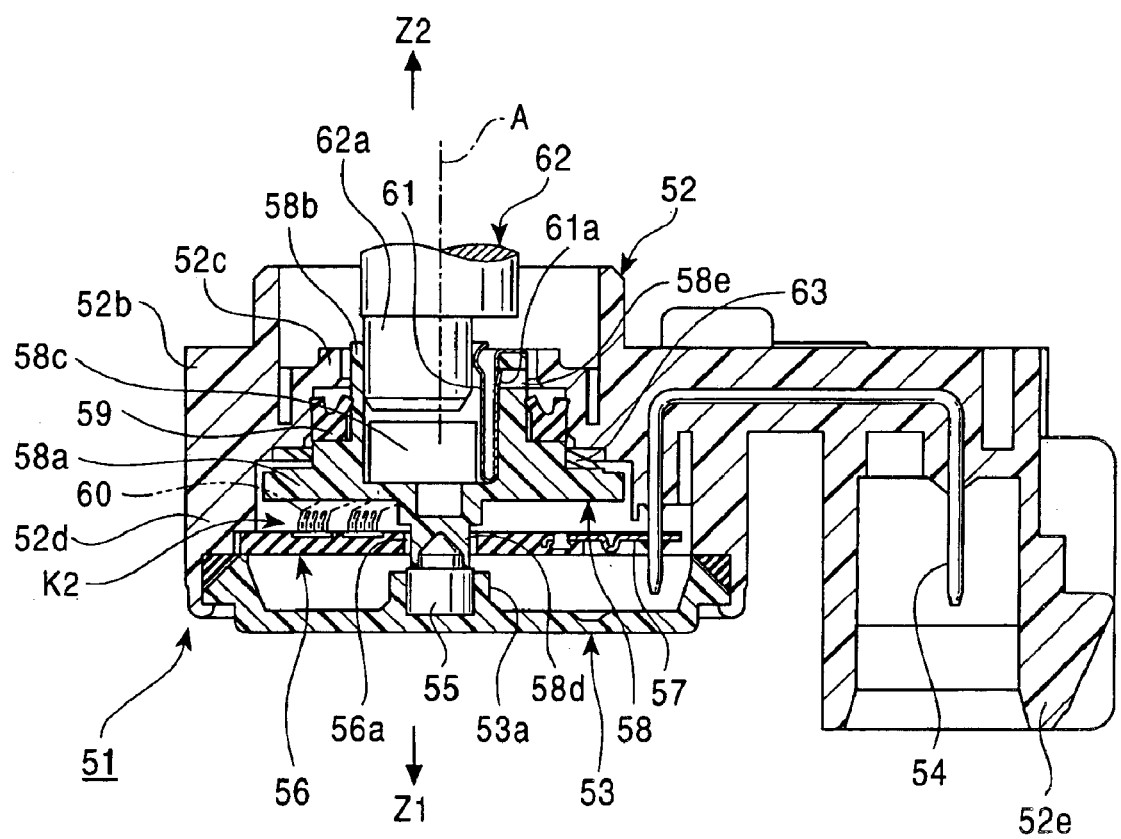
FIG. 12 is a sectional view of an essential part of a conventional rotary sensor.

In addition, according to the embodiments described above, the drive shaft 12 is clamped by the U-shaped elastic member 11; alternatively, as shown in FIG. 12, the drive shaft may also be pushed to the rotator by the elastic member.

In this case, the combined frictional force of the frictional force between the drive shaft 12 and the elastic member 11 and that between the drive shaft 12 and the rotator 8 is increased larger than the frictional force between the elastic member 11 and the rotator 8.

Also, the elastic member 11 is held relative to the rotator 8 movably in the Z2 direction.

What is claimed is:

1. A rotary sensor comprising:
a casing having a support portion;
a rotator rotatably supported within the casing;
detecting means operated by the rotation of the rotator;
a first elastic member attached to the rotator;
a drive shaft supported by the first elastic member for rotating the rotator; and
a second elastic member for pushing one end of the rotator to the support portion by pushing the rotator in the axial direction of the drive shaft,
wherein between the rotator and the first elastic member, the first elastic member is held to the rotator relatively and slidably in the axial direction of the drive shaft so as to enable the one end of the rotator to be pushed to the support portion when the support portion moves away from the rotator in the axial direction and/or when the drive shaft moves relatively to the rotator in the axial direction coming off the rotator.

2. A sensor according to claim 1, wherein the drive shaft is clamped by the first elastic member, and
wherein the frictional force between the drive shaft and the first elastic member is larger than the frictional force between the first elastic member and the rotator, so that when the drive shaft moves in the axial direction, relative sliding is performed between the rotator and the first elastic member in the axial direction of the drive shaft without moving the rotator in the axial direction of the drive shaft.

3. A sensor according to claim 1, wherein the drive shaft is clamped between the first elastic member and the rotator by pushing the first elastic member so as to elastically push the rotator while the combined frictional force of the frictional force between the drive shaft and the first elastic member and that between the drive shaft and the rotator is larger than the frictional force between the first elastic member and the rotator, so that when the drive shaft moves in the axial direction, relative sliding is performed between the rotator and the first elastic member in the axial direction of the drive shaft without moving the rotator in the axial direction of the drive shaft.

4. A sensor according to claim 1, wherein when the casing expands or contracts by changes in the external environment, the drive shaft and the first elastic member do not move so as to maintain initial positions while the rotator is moved by the second elastic member.

5. A sensor according to claim 1, wherein the first elastic member is accommodated and attached within a concave accommodation portion disposed in the rotator, and relative sliding is performed between a wall of the accommodation portion and the first elastic member.

6. A sensor according to claim 5, wherein the first elastic member is U-shaped while the drive shaft is clamped and supported by the U-shaped first elastic member, and wherein in the state that the drive shaft and the first elastic member maintain the initial positions, relative sliding is performed between the wall of the accommodation portion and the first elastic member.

7. A sensor according to claim 6, wherein the U-shaped first elastic member comprises a pair of first and second legs opposing each other with both of one end connected together with a connection portion, the respective first and second legs elastically push the wall of the accommodation portion.

8. A sensor according to claim 7, wherein the wall of the accommodation portion is provided with a concave engaging section while the leg is provided with a protruding anchoring section so that the engaging section can be brought into engagement with the anchoring section, preventing the first elastic member from coming off the rotator.

9. A sensor according to claim 8, wherein the rotator is molded from a synthetic resin while the first elastic member is made of a metallic leaf spring.

* * * * *